(12) United States Patent
Doig

(10) Patent No.: US 8,141,587 B2
(45) Date of Patent: Mar. 27, 2012

(54) DUCKBILL TYPE CHECK VALVE WITH CURVED AND RESILIENTLY BIASED CLOSING SEAL

(76) Inventor: Ian Doig, Dora Creek (AU)

( * ) Notice: Subject to any disclaimer, the term of this patent is extended or adjusted under 35 U.S.C. 154(b) by 196 days.

(21) Appl. No.: 12/596,678

(22) PCT Filed: May 5, 2008

(86) PCT No.: PCT/AU2008/000619
§ 371 (c)(1),
(2), (4) Date: Oct. 20, 2009

(87) PCT Pub. No.: WO2008/134808
PCT Pub. Date: Nov. 13, 2008

(65) Prior Publication Data
US 2010/0288373 A1 Nov. 18, 2010

(30) Foreign Application Priority Data
May 7, 2007 (AU) ................................ 2007902382

(51) Int. Cl.
*F16K 15/14* (2006.01)
(52) U.S. Cl. ........................................ 137/847; 137/846
(58) Field of Classification Search ............ 137/843–849
See application file for complete search history.

(56) References Cited

U.S. PATENT DOCUMENTS

| | | | |
|---|---|---|---|
| 2,433,602 A * | 12/1947 | Coss | 285/242 |
| 3,387,624 A * | 6/1968 | Soucy | 137/847 |
| 3,595,266 A * | 7/1971 | Brookman et al. | 137/519 |
| 3,640,645 A | 2/1972 | Forsythe | |
| 3,967,645 A | 7/1976 | Gregory | |
| 4,524,805 A | 6/1985 | Hoffman | |
| 4,842,588 A | 6/1989 | Jones | |
| 4,870,992 A | 10/1989 | Irwin et al. | |
| 5,769,125 A | 6/1998 | Duer et al. | |
| 5,881,772 A | 3/1999 | Bennett | |

FOREIGN PATENT DOCUMENTS

GB 2153048 A 8/1985

\* cited by examiner

*Primary Examiner* — Kevin Lee
*Assistant Examiner* — Macade Brown
(74) *Attorney, Agent, or Firm* — Coats and Bennett PLLC

(57) ABSTRACT

A check valve is provided comprising a conduit for conveying a fluid, the conduit having an inlet and an outlet, the conduit having a first region adjacent the outlet (13) comprising a flexible wall, two opposing sides of the flexible wall converging towards each other to form a closed geometry when the pressure of the fluid upstream of the inlet and the pressure of the fluid downstream of the outlet are substantially equal, the closed geometry comprising each of the opposing sides (23, 24) being arcuate in cross-section and lying against each other in a substantially sealing relationship (21, 22). Preferably, two connecting regions of the wall connecting the two opposing sides (15, 16) are biased towards each other by a biasing means. Preferably, the biasing means comprises one or more flexible ring members (25) encircling the flexible wall attached at points (25A and 25B). Preferably, the conduit takes the form of a duck beak valve (20). The figure shows an end view onto the check valve outlet.

6 Claims, 4 Drawing Sheets

DUCKBILL TYPE CHECK VALVE WITH CURVED AND RESILIENTLY BIASED CLOSING SEAL

This application is a U.S. National Stage application of PCT Application No. PCT/AU2008/000619, with an international filing date of May 5, 2008, and claims priority based on Australian application 2007902382, filed May 7, 2007, which is incorporated herein by reference.

FIELD OF THE INVENTION

The present invention relates to check valves and duckbeak valves.

BACKGROUND OF THE INVENTION

Duck beak check valves typically have a tubular inlet part that flattens towards its outlet—like the beak of a duck. In some duck beak valves the downstream parts are split at each side to form two opposing flaps.

Duck beak valves are used to control the influx of tidal waters into sewer and storm water outlets that discharge waste-water into open waters. They were also used as the check valve on World War II gas masks.

Current "duck beak" check valves rely on a superior downstream ("back") pressure to close sealingly. If these valves are the inlet and outlet valves of a reciprocating pump that relies on creating a sub-atmospheric (vacuum) pressure in its inlet line to "lift" water into its inlet when pumping starts, back pressure on the valves can be insufficient to fully close the valve and produce an adequate seal, because the initially flat sealing surfaces tend, with time, to remain partly open.

In these circumstances the pump either fails to lift and begin pumping liquid, or it does so at a reduced rate.

In the prior art the "duck beak" in its closed configuration resembles a flattened tube at its outlet wherein a flat first inner surface sealingly contacts a flat second inner surface to provide a seal. In the absence of an adequate back pressure, it can be difficult to sustain the seal when the valve is closed. Stiffening of the tube walls near to the outlet, or closure of a part, or parts, of the outlet provide prior art remedies, but these means introduce disadvantages where the valve is to seal adequately while accommodating slurries containing large solids.

Prior art invention WO 2006/108219 provides means of reinforcing the duck beak to operate against a higher outlet pressure, but does not ameliorate the problem of decay causing the seal to become loose and ineffective over time.

OBJECTIVE OF THE INVENTION

To provide a means of ensuring that the "duck beak" check valve will seal in the absence of an adequate back pressure.

SUMMARY OF THE INVENTION

According to a first aspect of the present invention, a check valve is provided comprising a conduit for conveying a fluid, the conduit having an inlet and an outlet, the conduit having a first region adjacent the outlet comprising a flexible wall, two opposing sides of the flexible wall converging towards each other to form a closed geometry when the pressure of the fluid upstream of the inlet and the pressure of the fluid downstream of the outlet are substantially equal, the closed geometry comprising each of the opposing sides being arcuate in cross-section and lying against each other in a substantially sealing relationship.

Preferably, two connecting regions of the wall connecting the two opposing sides are biased towards each other by a biasing means.

Preferably, the biasing means comprises one or more flexible ring members encircling the flexible wall.

Preferably, the one or more flexible ring members are each an elastomeric loop.

Preferably, the one or more flexible ring members are a metal C-clip.

Preferably, the conduit takes the form of a duck beak valve.

Preferably, the two connecting regions are a first connecting region and a second connecting region and the biasing means comprises one or more flexible cords, elastic bands or ribbons, each having a first end region and a second end region, wherein the first end region is anchored to or adjacent to the first connecting region by a first anchoring means, and the second end region is anchored to or adjacent to the second connecting region by a second anchoring means. This forms a chord linking the first connecting region or an adjacent point to the second connecting region or an adjacent point.

Preferably, the first and second anchoring means each comprise a hook or eyelet attached to one or both of the opposing sides adjacent the respective connecting region by an attachment means.

Preferably, the first and second anchoring means each comprise a bolting arrangement.

Preferably, the attachment means comprises an adhesive attachment, a fusion attachment or a bolting attachment.

The present invention provides improvements to the prior art. The present invention provides improvements that are beneficial when the valves are the inlet and outlet valves of diaphragm pumps pumping slurries containing large solids.

In these applications the inlet valves are positioned above the pump and outlet valves to avoid accumulation of solids in the valve housings and the diaphragm pump.

When the inlet valves are elevated above the pump and the outlet valves, the pump must initially draw air into its inlet before drawing liquid and begin pumping. If the valves do not seal reliably pumping of liquid is either delayed, or fails to begin.

Embodiments of the present invention avoid these disadvantages by curving the first and second inner surfaces of the duck beak part and linking the outermost sides of the curved outlet part of the duck beak by a cord or ribbon or flexible member that introduces a small tension pulling the outermost sides towards each other, and a rotation moment that rotates the first and second inner surfaces of the duck beak towards each other.

Where the first and second inner surfaces form an arc the length of the tube wall adjacent the width of the first inner surface will be longer than that adjacent the second inner surface and the cord or ribbon will stretch across adjacent the chord of the arc. A small tension on the flexible cord, ribbon, or cable serves to press the first and second inner surfaces together to form a seal.

When the upstream pressure sufficiently exceeds the downstream pressure, the first and second surfaces are forced apart and the valve opens.

In other embodiments more than one flexible cord, ribbon, or cable may be employed to apply the small tension.

DETAILED DESCRIPTION OF SPECIFIC EMBODIMENTS

Figure 1:
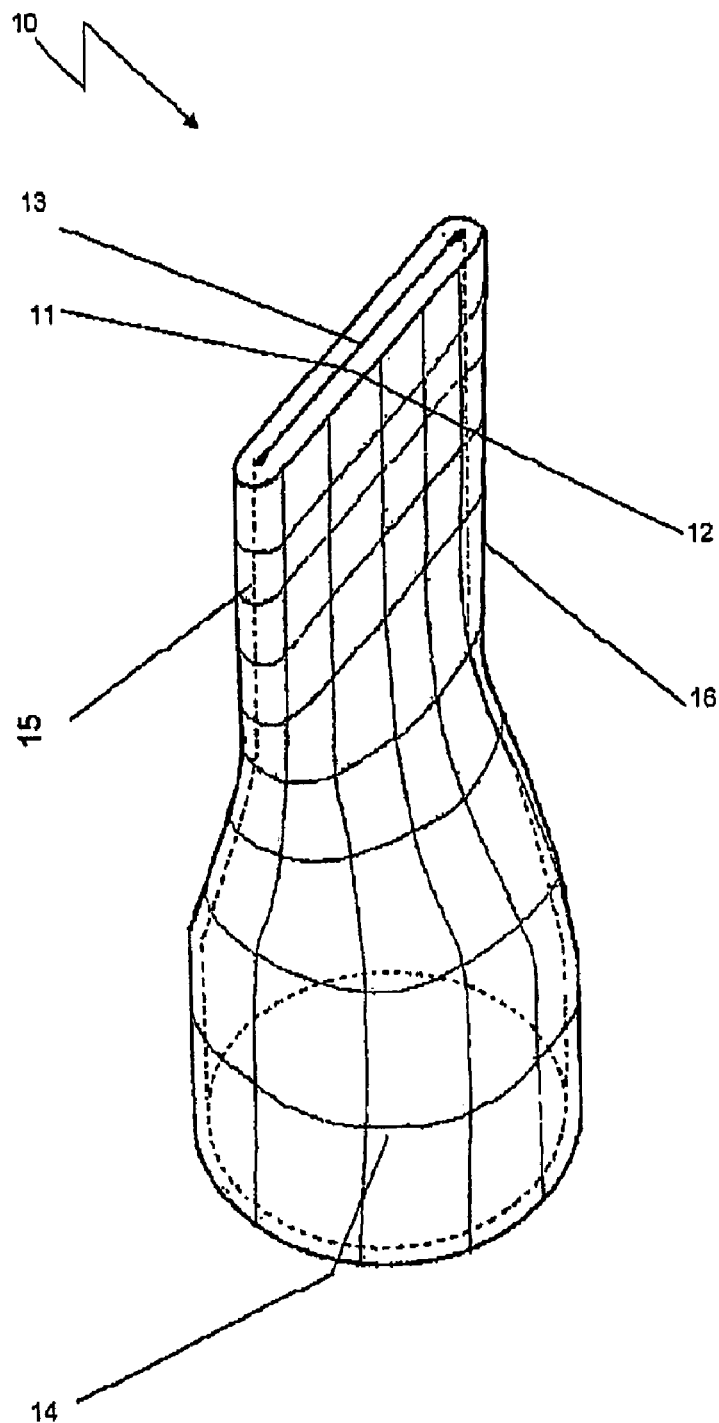
FIG. 1 is a view of a flat form duck-beak check valve in the closed position.

Preferred embodiments of the invention will now be described, by way of examples only, with reference to the accompanying drawings in which:

FIG. 1 shows a view of the flexible parts of a closed duck beak check valve 10 with an outlet 13 and an inlet 14. It has the form of a tube flattened towards its outlet end. First and second inner surfaces 11 and 12 are flat and meet to form the valve seal. Each side 15 and 16 of the flattened tube is rounded and biased to sustain the flattened shape in its relaxed state as shown.

Figure 2:
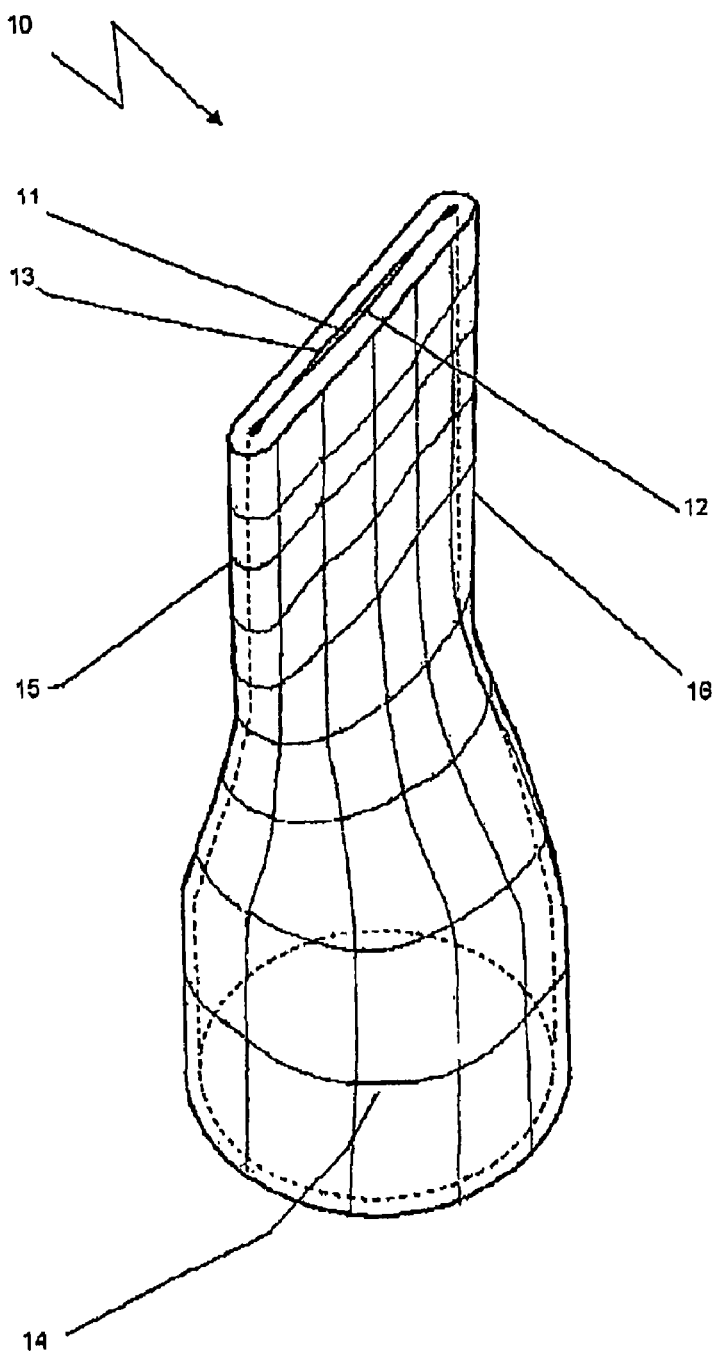
FIG. 2 is the FIG. 1 view with the valve shown slightly open.

FIG. 2 shows the duck-beak check valve of FIG. 1 with the inner surfaces 11 and 12 slightly separated at the outlet. FIG. 2 illustrates what happens after a period in service when the downstream (or back) pressure on the valve is inadequate to fully close the valve. Like numerals indicate features in common with FIG. 1.

Figure 3:
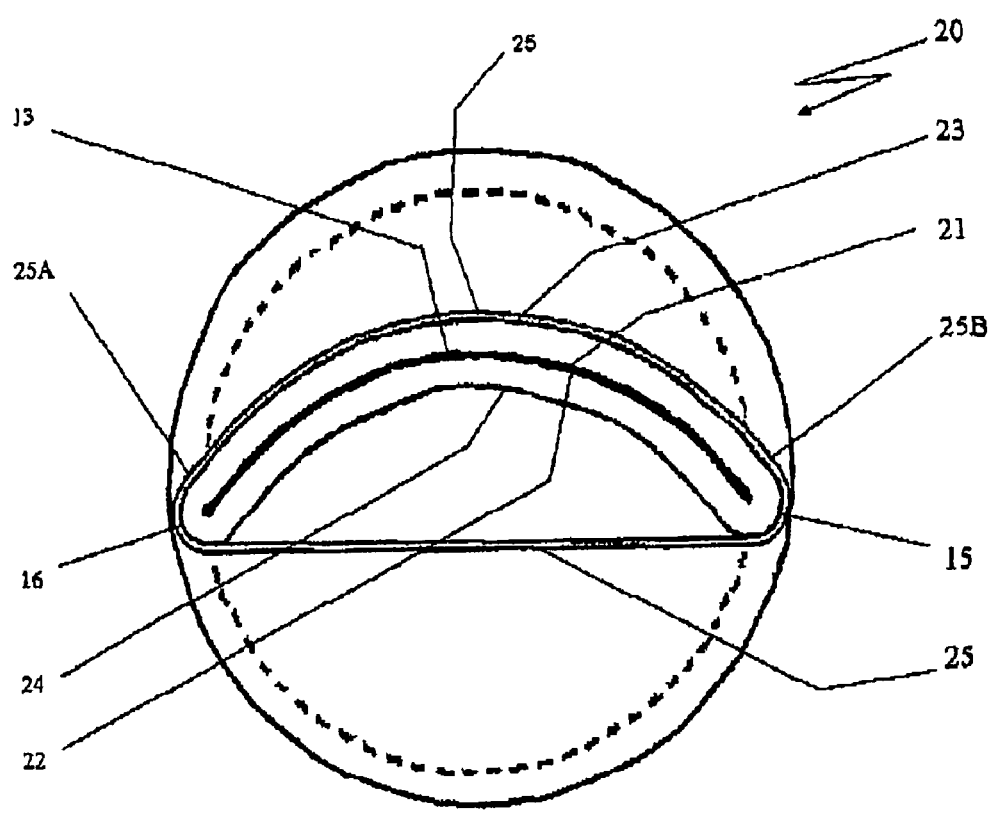
FIG. 3 is an outlet end view of a duck-beak check valve in accordance with a preferred embodiment of the present invention where the flat sides of the valve are shown curved into an arc shape by a flexible band across the chord of the arc.

FIG. 3 shows an end view of a duck beak check valve 20 in accordance with an embodiment of the invention in which like numerals indicate features in common with FIGS. 1 and 2. When compared with FIGS. 1 and 2, the key difference is that the duck beak outlet parts are no longer flat, but curved, with first inner surface 21 and second inner surface 22 meeting to form a seal. In this example the surfaces 21 and 22 are the inner surfaces of a flexible walled tube. They are concavely curved with the surrounding tube wall biased during manufacture to sustain this shape in the valve's relaxed state. The sides 15 and 16 of the duck beak outlet parts are rounded as shown in FIGS. 1 and 2. Surfaces 23 and 24 are the outer surfaces of the tube wall respectively adjacent to the surfaces 21 and 22.

If the sides 15 and 16 of the concavely curved duck beak outlet parts are moved apart the radii of the surfaces 21 and 22 will increase, but the radius of the inner surface 22 will increase relatively more than that of outer surface 23, and the surfaces 21 and 22 will move apart.

If the sides 15 and 16 of the duck beak outlet parts are moved towards each other the radii of both surfaces 21 and 22 will decrease, but the radius of the inner surface 22 will be constrained by that of outer surface 21, and the surfaces 21 and 22 will be pushed together to form a secure seal. Note that if excessive force is used to move the sides 15 and 16 of the duck beak outlet parts towards each other the tube walls adjacent surface 22 will be excessively compressed and buckle. If this occurs a gap will form between the surfaces 21 and 22, and they will not form a seal.

In this example a flexible cord, or an elastic band, or a ribbon 25 is placed around the outer surface 23 and extends across the chord of the arc between the sides 15 and 16.

Tension in the flexible cord, or band, or ribbon 25 is adjusted by expanding it, or shrinking it, relative to surface 23 to provide the required sealing force between surfaces 21 and 22 while the valve is in its relaxed state. When the required tension is obtained the one or more flexible cords or band 25 is fixed adhesively to locations 25A and 25B on the surface 23. This also applies a rotational moment to the two ends 15 and 16 by the cord 28, which pushes surface 22 towards surface 21.

Appropriate tensioning of the flexible cord, or elastic band or ribbon 25 determines the upstream/downstream pressure difference at which the valve opens.

Advantages of this arrangement are:
(1) that when a superior upstream pressure opens the duck beak check valve 20, the outer surface 24 moves freely before contacting band 25, and further (full) opening of valve 20 extends band 25 by a minimum extent only, and
(2) if solids become lodged between the closing surfaces of the valve upstream of the outlet end, they do not hold the valve open at its outlet end.

It follows from (1) that extensions of the band 25 are small, and it is not unduly fatigued during successive openings of valve 20.

In alternative examples of this embodiment of the invention more than one cord, or elastic band, or ribbon may be employed in place of the one cord, or elastic band, or ribbon 25 in FIG. 3, each with their separate points of attachment 25A and 25B.

In a further alternative example of this embodiment of the invention the elastic band, or ribbon 25 may be replaced by a metal C clip comprising only the curved shape parts adjacent the outer surface 23 and rounded ends 15 and 16, and omitting the straight chord part between the two sides 15 and 16.

Figure 4:
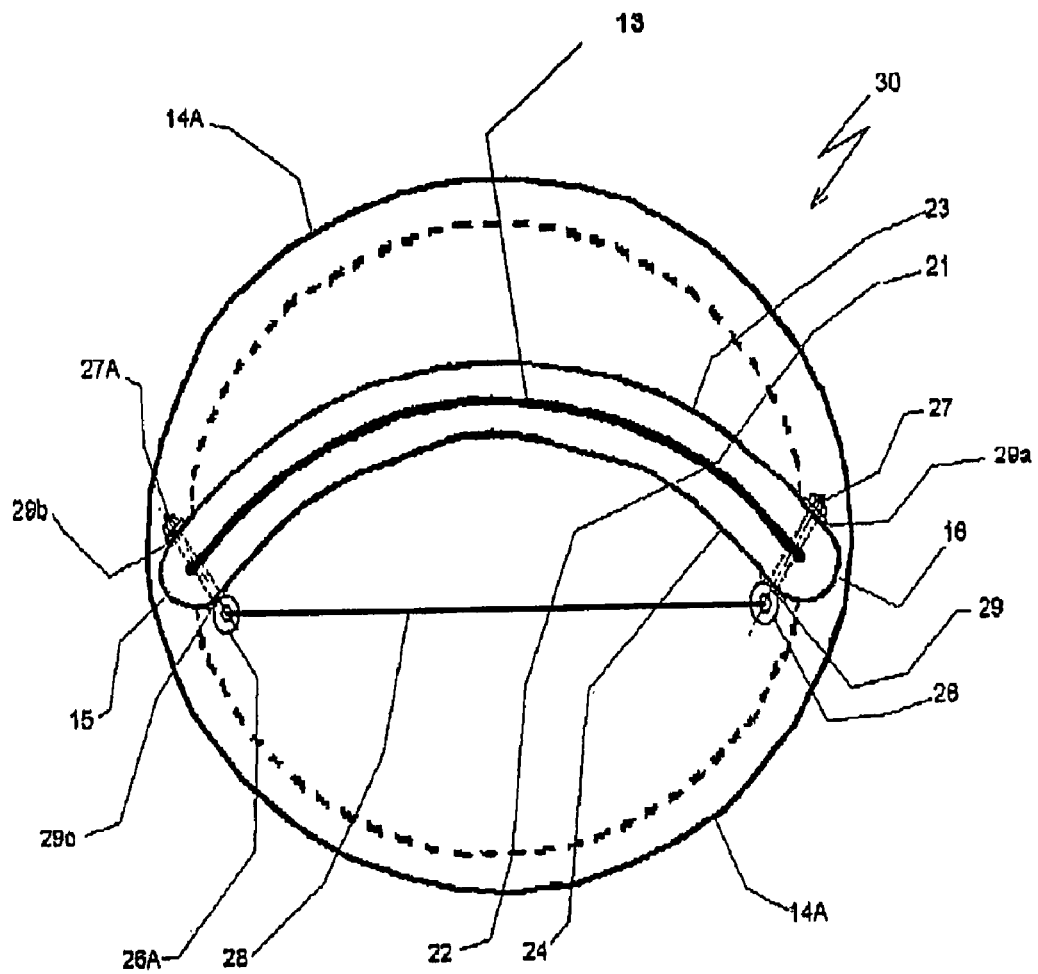
FIG. 4 is an outlet end view of a duck-beak check valve in accordance with another preferred embodiment of the present invention where the flat sides of the valve are shown curved into an arc shape by a flexible cord located across the cord of the arc.

FIG. 4 shows an end view of a further alternative duck beak check valve 30 in accordance with another embodiment of the invention in which like numerals indicate features in common with FIG. 3. In this example an elastic cord 28 is tethered between the anchoring means comprising an eyelet bolt 26 at one end, and an eyelet bolt 26A at the other end of the cord.

These eyelet bolts pass through the flattened tube walls adjacent each end 15 and 16 as shown, and are secured by the nuts 27 and 27A. Washers 29 and 29c, are placed between the eyelets 26 and 26A and the outside surface 24 of the flattened tube, and washers 29a and 29b, are placed between the nuts 27 and 27A and the outside surface 23 of the flattened tube. Appropriate tightening of the nuts 27 and 27A closes the surfaces 21 and 22 together at the ends 15 and 16 to secure the seal, and allow a rotational moment to be applied the two ends 15 and 16 by the cord 28, which can be increased by increasing the distance of the tethering point from the surface 24, and the anchoring means can be a bolt-attached hook, or pivot, or a simple bolt and nut in place of the eyelet, and any of these can be attached by a fusion or adhesion means in place of the bolting means.

In alternative examples of this embodiment of the invention more than one elastic cord 28 may be employed in place of the one elastic cord 28 in FIG. 4, each with their separate eyelet bolts 26 and 26A, nuts 27 and 27A, and washers 29, 29a, 29b and 29c, or alternative fusion or adhesion means of attachment.

Appropriate tensioning of the cord(s) 28 determines the upstream/downstream pressure difference at which the valve opens.

It will be appreciated by persons skilled in the art that numerous variations and/or modifications may be made to the invention as shown in the specific embodiments without departing from the spirit or scope of the invention as broadly described.

The present examples are, therefore, to be considered in all respects as illustrative and not restrictive.

For example,

Means other than an elastic band or ribbon or cord may be used provide tension between the valve sides 15 and 16. The concave curving of the duck beak valve downstream parts need not be in the form of an arc (e.g. it could be angular).

The term fluid in this embodiment of the invention is used to cover either gas or liquid in a single phase form, as well as covering two or three phase fluids comprising any combination of gases, liquids or solids. The gases, liquids or solids can be compounds, composites and/or mixtures.

The invention claimed is:

1. A check valve comprising:
   a conduit for conveying a fluid, the conduit having an inlet and an outlet disposed along a longitudinal axis; the conduit having a flexible section adjacent the outlet;
   the flexible section having two opposing wall portions abutting each other to form a closed geometry when the pressure of the fluid upstream of the inlet and the pressure of the fluid downstream of the outlet are substantially equal; the flexible section movable to an open geometry wherein the opposing wall portions are spaced from each other to form an outlet opening;
   the flexible section further comprising two connecting regions connecting the two opposing wall portions;
   the opposing wall portions, in the closed geometry, being arcuate in cross-section and lying against each other in a substantially sealing relationship; wherein the connecting regions form the outer tips of the arcuate cross-section;
   wherein the two connecting regions are biased towards each other by a first biasing member in a direction along a theoretical chord that extends from one connecting region to the other;
   wherein, when the flexible section is in the closed geometry, the first biasing member extends around an exterior of the flexible section, generally normal to the longitudinal axis, and extends along the chord in spaced relation to the closer of the two wall portions.

2. A check valve as claimed in claim 1 wherein the first biasing member is an elastomeric loop.

3. A check valve according to claim 1 wherein the conduit takes the form of a duck beak valve.

4. A check valve according to claim 1 wherein the first biasing member is anchored to the connecting regions at respective spaced apart locations.

5. A check valve of claim 1 wherein the first biasing member extends around an exterior of the flexible section and generally normal to the longitudinal axis.

6. A check valve comprising:
   a conduit for conveying a fluid, the conduit having an inlet and an outlet disposed along a longitudinal axis; the conduit having a flexible section adjacent the outlet;
   the flexible section having two opposing wall portions abutting each other to form a closed geometry when the pressure of the fluid upstream of the inlet and the pressure of the fluid downstream of the outlet are substantially equal; the flexible section movable to an open geometry wherein the opposing wall portions are spaced from each other to form an outlet opening;
   the flexible section further comprising two connecting regions connecting the two opposing wall portions;
   the opposing wall portions, in the closed geometry, being arcuate in cross-section and lying against each other in a substantially sealing relationship; wherein the connecting regions form the outer tips of the arcuate cross-section;
   wherein the two connecting regions are biased towards each other by a first biasing member in a direction along a theoretical chord that extends from one connecting region to the other;
   wherein, when the flexible section is in the closed geometry, the first biasing member extends exterior to the flexible section along the chord in spaced relation to the closer of the two wall portions.

* * * * *